(12) United States Patent
Endoh

(10) Patent No.: US 8,980,125 B2
(45) Date of Patent: Mar. 17, 2015

(54) ACTIVE MATERIAL, BATTERY, AND METHOD FOR MANUFACTURING ELECTRODE

(75) Inventor: Kazuaki Endoh, Fukushima (JP)

(73) Assignee: Sony Corporation, Tokyo (JP)

(*) Notice: Subject to any disclaimer, the term of this patent is extended or adjusted under 35 U.S.C. 154(b) by 1198 days.

(21) Appl. No.: 12/766,050

(22) Filed: Apr. 23, 2010

(65) Prior Publication Data

US 2010/0285366 A1 Nov. 11, 2010

(30) Foreign Application Priority Data

May 7, 2009 (JP) ................ P2009-112685

(51) Int. Cl.
- *H01M 4/88* (2006.01)
- *H01M 4/13* (2010.01)
- *H01M 4/139* (2010.01)
- *H01M 4/36* (2006.01)
- *H01M 4/02* (2006.01)
- *H01M 10/0525* (2010.01)

(52) U.S. Cl.
CPC ............ *H01M 4/13* (2013.01); *H01M 4/139* (2013.01); *H01M 4/364* (2013.01); *H01M 4/02* (2013.01); *H01M 10/0525* (2013.01); *H01M 2004/021* (2013.01); *Y02E 60/122* (2013.01)
USPC ............ 252/182.1; 252/519.1; 429/129; 429/218.1; 429/219; 429/223; 429/231.95

(58) Field of Classification Search
USPC ............ 252/182.1, 519.1; 429/129, 219, 223, 429/231.9, 218.1
See application file for complete search history.

(56) References Cited

U.S. PATENT DOCUMENTS

2007/0105017 A1* 5/2007 Kawase et al. ............. 429/218.1
2008/0193834 A1* 8/2008 Murakami et al. ............ 429/129

FOREIGN PATENT DOCUMENTS

| EP | 1241721 A2 * | 2/2002 | ............ H01M 4/52 |
|---|---|---|---|
| JP | 6-325791 | 11/1994 | |
| JP | 9-035715 | 2/1997 | |
| JP | 3232984 | 5/1997 | |
| JP | 11-273678 | 10/1999 | |
| JP | 2001-155729 | 6/2001 | |
| JP | 2003-217582 | 7/2003 | |
| JP | 2004-119218 | 4/2004 | |
| JP | 2006-114408 | 4/2006 | |
| JP | 2006-302880 | * 11/2006 | ............ H01M 4/58 |
| JP | 2008-153017 | 7/2008 | |
| JP | 2008-153197 | 7/2009 | |
| JP | 2010-070427 | 4/2010 | |
| WO | 2008-062895 | 5/2008 | |

OTHER PUBLICATIONS

Japanese Office Action issued Aug. 20, 2013 for corresponding Japanese Appln. No, 2009-112685.

* cited by examiner

*Primary Examiner* — Khanh Tuan Nguyen
(74) *Attorney, Agent, or Firm* — K&L Gates LLP

(57) ABSTRACT

An active material for a nonaqueous electrolyte secondary battery includes first particles and second particles provided to coat the first particles so as to be scattered on the surfaces of the first particles. The circularity of the first particles coated with the second particles is 0.800 to 0.950, and the ratio r1/r2 of the average particle diameter r1 of the second particles to the average particle diameter r2 of the first particles is 1/20 to 1/2.

14 Claims, 8 Drawing Sheets

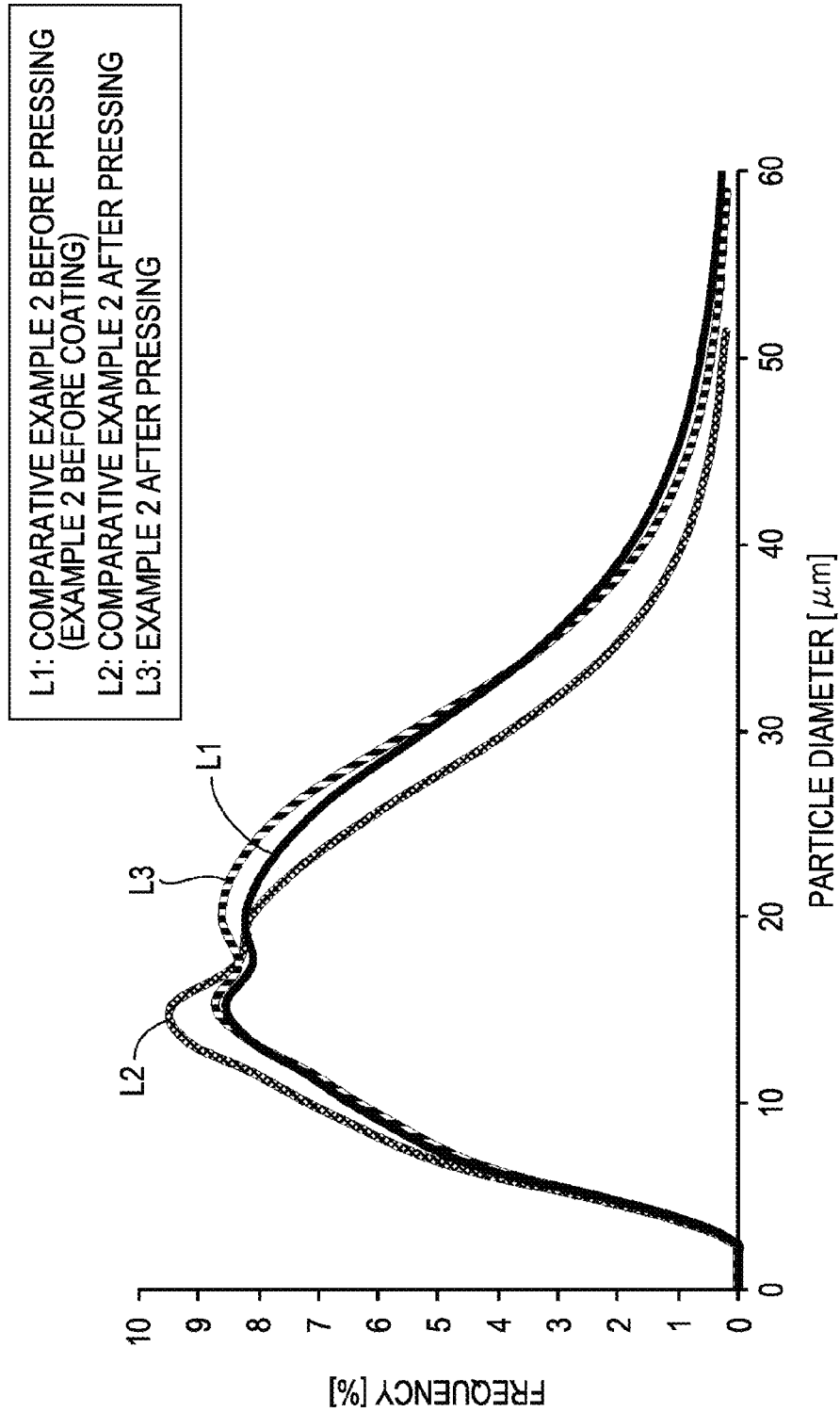

ACTIVE MATERIAL, BATTERY, AND METHOD FOR MANUFACTURING ELECTRODE

CROSS REFERENCES TO RELATED APPLICATIONS

The present application claims priority to Japanese Priority Patent Application JP 2009-112685 filed in the Japan Patent Office on May 7, 2009, the entire content of which is hereby incorporated by reference.

BACKGROUND

The present application relates to an active material, a battery, and a method for manufacturing an electrode. Specifically, the present application relates to an active material containing composite particles including first particles with surfaces coated with second particles.

In recent years, many portable electronic apparatuses such as camcorders (Videotape Recorder), cellular phones, notebook-size personal computers, and the like have been developed, and reduction in size and weight has been attempted. Accordingly, lightweight secondary batteries capable of achieving a high energy density have been developed as power supplies for these electronic apparatuses. An example of the secondary batteries capable of achieving a high energy density is a lithium-ion secondary battery.

Recently, various studies have been made for improving the characteristics of lithium-ion secondary batteries. Studies on active materials are one of the particularly intensive research fields, and for example, the techniques described in Japanese Unexamined Patent Application Publication Nos. 11-273678, 2001-155729, 6-325791, 2008-153197, and 9-35715 and Japanese Patent No. 3232984 are disclosed.

Japanese Unexamined Patent Application Publication Nos. 11-273678, 2001-155729, 6-325791, and 2008-153197 disclose techniques for improving filling properties and battery characteristics by primary particles having a uniform particle size distribution and aggregates thereof. However, the primary particles have a large specific surface area, thereby decreasing a capacity retention (cycle properties). In addition, Japanese Unexamined Patent Application Publication No. 2008-153197 describes that the filling properties are adversely affected by aggregation of particles.

Japanese Patent No. 3232984 discloses a technique for improving battery characteristics by mixing secondary particles including aggregates of many microcrystal grains and microcrystal grains prepared by grinding the secondary particles. However, like in Japanese Unexamined Patent Application Publication Nos. 11-273678, 2001-155729, 6-32579, and 2008-153197, this technique uses only one type of microcrystal grains and thus exhibits a large specific surface area, thereby decreasing the capacity retention. In addition, a grinding step is further added for granulation, thereby causing decrease in productivity.

Japanese Unexamined Patent Application Publication No. 9-35715 discloses a technique for increasing the energy density and improving cycle characteristics by aggregating fine particles on the peripheries of core particles. However, when the inventors formed a battery by the disclosed method, the filling properties were not improved from those before aggregation by coating the peripheries of core particles with aggregates of fine particles, and the discharging capacity (battery capacity) tended to decrease. In addition, since the particle shape described in Japanese Unexamined Patent Application Publication No. 9-35715 has a large specific surface area, the capacity retention tended to decrease.

Japanese Unexamined Patent Application Publication No. 11-273678 discloses a technique for improving battery characteristics by mixing fine primary particles with secondary particles thereof. However, when the inventors formed a battery by the disclosed method, the filling properties were degraded during pressing, and the discharging capacity tended not to be improved.

SUMMARY

It is desirable to provide an active material having good discharging capacity and capacity retention, a battery, and a method for manufacturing an electrode.

An active material for a nonaqueous electrolyte secondary battery according to a first embodiment includes first particles and second particles provided to coat the first particles so as to be scattered on the surfaces of the first particles. The circularity of the first particles coated with the second particles is 0.800 to 0.950, and the ratio $r1/r2$ of the average particle diameter $r1$ of the second particles to the average particle diameter $r2$ of the first particles is 1/20 to 1/2.

A method for manufacturing an electrode for a nonaqueous electrolyte secondary battery according to a second embodiment includes the steps of synthesizing composite particles by mixing first particles with second particles and heat-treating the resultant mixture to coat the first particles with the second particles so that the second particles are scattered on the surfaces of the first particles, forming an active material layer containing the composite particles, and pressuring the active material layer to separate the second particles from the surfaces of the first particles and fill the second particles in gaps between the first particles. The circularity of the first particles coated with the second particles is 0.800 to 0.950, and the ratio $r1/r2$ of the average particle diameter $r1$ of the second particles to the average particle diameter $r2$ of the first particles is 1/20 to 1/2.

A nonaqueous electrolyte secondary battery according to a third embodiment includes a cathode, an anode, and an electrolyte, wherein at least one of the cathode and the anode is formed by synthesizing composite particles by mixing first particles with second particles and heat-treating the resultant mixture to coat the first particles with the second particles so that the second particles are scattered on the surfaces of the first particles, forming an active material layer containing the composite particles, and pressuring the active material layer to separate the second particles from the surfaces of the first particles and fill the second particles in gaps between the first particles. The circularity of the first particles coated with the second particles is 0.800 to 0.950, and the ratio $r1/r2$ of the average particle diameter $r1$ of the second particles to the average particle diameter $r2$ of the first particles is 1/20 to 1/2.

According to an embodiment, an active material includes first particles and second particles provided to coat the first particles so as to be scattered on the surfaces of the first particles. The circularity of the first particles coated with the second particles is 0.800 to 0.950, and the ratio $r1/r2$ of the average particle diameter $r1$ of the second particles to the average particle diameter $r2$ of the first particles is 1/20 to 1/2. An active material layer containing the active material having the above-described configuration is formed and pressurized to separate the second particles from the surfaces of the first particles and fill the second particles in gaps between the first particles. Therefore, the filling rate of the first particles and the second particles in the active layer may be improved, and the discharging capacity may be improved. In addition, when the active material layer is pressurized, the second particles are separated from the surfaces of the first particles, thereby suppressing the occurrence of cracks in the first particles. Therefore, it may be possible to suppress an increase in the specific surface area of the active material and suppress a decrease in capacity retention.

As described above, according to an embodiment, an active material having excellent discharging capacity and capacity retention may be produced Additional features and advantages are described herein, and will be apparent from the following Detailed Description and the figures.

BRIEF DESCRIPTION OF THE FIGURES

FIG. 10 is a graph showing particle size distributions of composite particles of Example 2 and mixed particles of Comparative Example 2 before and after pressing.

DETAILED DESCRIPTION

The present application is described in detail below with reference to the drawings according to an embodiment.
(1) First embodiment (example of cylindrical battery)
(2) Second embodiment (example of flat battery)

1. First Embodiment

Configuration of Battery

Figure 1:
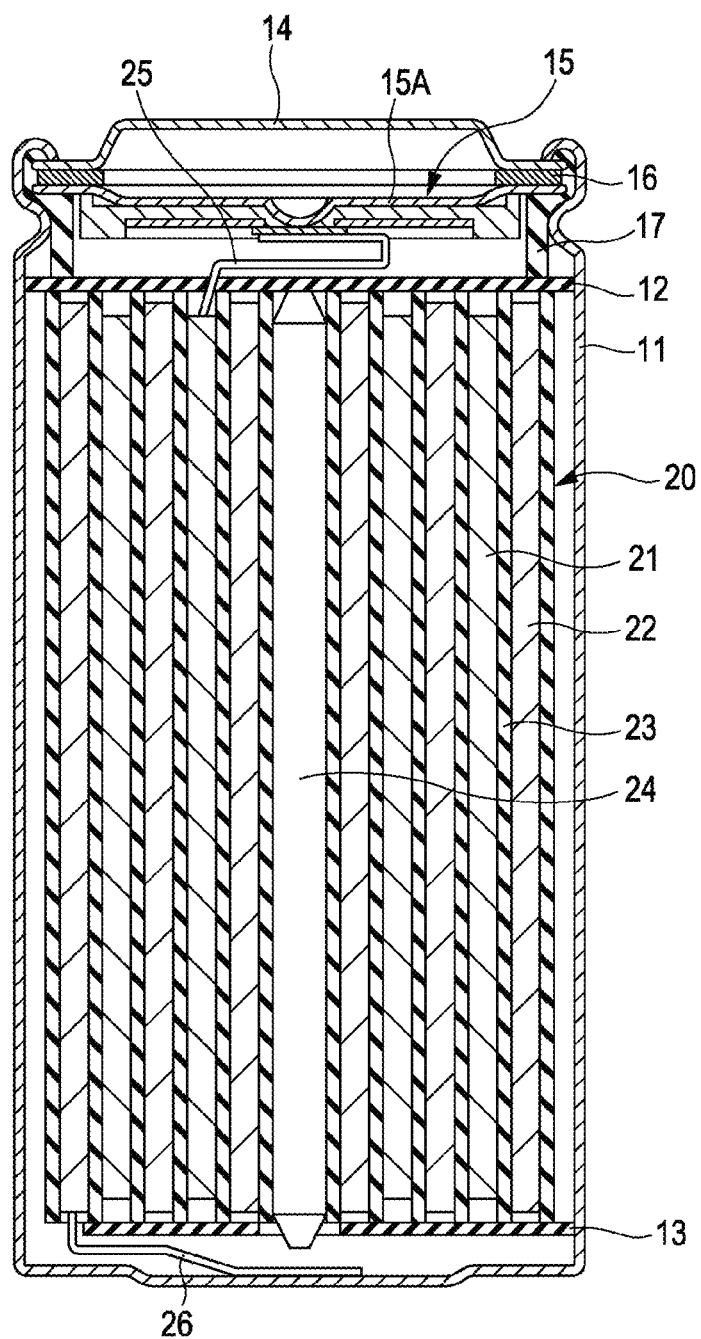
FIG. 1 is a sectional view showing a configuration example of a nonaqueous electrolyte secondary battery according to a first embodiment.

FIG. 1 is a sectional view showing a configuration example of a nonaqueous electrolyte secondary battery according to a first embodiment. The nonaqueous electrolyte secondary battery is a so-called lithium-ion secondary battery in which the anode capacity is represented by a capacity component due to occlusion and release of lithium (Li) as an electrode reactive material. The nonaqueous electrolyte secondary battery is a so-called cylindrical type in which a wound electrode body 20 is placed in a substantially hollow cylindrical battery can 11, the wound electrode body 20 being formed by laminating a pair of strip-shaped cathode 21 and anode 22 with a separator 23 provided therebetween and then winding the laminate. The battery can 11 is composed of, for example, nickel (Ni)-plated iron (Fe) and has a closed end, the other end being open. For example, an electrolyte solution is injected as an electrolyte into the battery can 11 and impregnated into the separator 23. In addition, a pair of insulating plates 12 and 13 are disposed perpendicularly to the winding peripheral surface so as to sandwich the wound electrode body 20 therebetween.

A battery cover 14, a safety valve mechanism 15, and a heat-sensitive resistor element (Positive Temperature Coefficient; PTC element) 16 are provided on the open end of the battery can 11 by caulking through a sealing gasket 17. As a result, the inside of the battery can 11 is closed. The battery cover 14 is composed of, for example, the same material as the battery can 11. The safety valve mechanism 15 is electrically connected to the battery cover 14 so that when the internal pressure in the battery becomes a predetermined value or more due to internal short-circuiting or external heating, a disk plate 15A is inverted to cut an electrical connection between the battery cover 14 and the wound electrode body 20. The sealing gasket 17 is composed of, for example, an insulating material, and has an asphalt-coated surface.

For example, a center pin 24 is inserted in the center of the wound electrode body 20. In the wound electrode body 20, a cathode lead 25 composed of aluminum (Al) or the like is connected to the cathode 21, and an anode lead 26 composed of nickel or the like is connected to the anode 22. The cathode lead 25 is electrically connected to the battery cover 14 by welding to the safety valve mechanism 15, and the anode lead 26 is electrically connected to the battery can 11 by welding.

Figure 2:
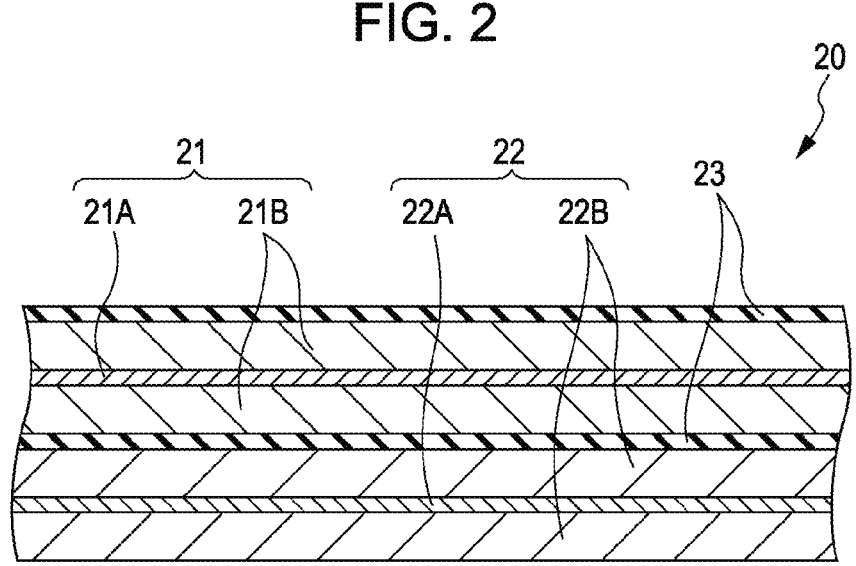
FIG. 2 is an enlarged sectional view showing a portion of a wound electrode body shown in FIG. 1.

FIG. 2 is an enlarged sectional view showing a portion of the wound electrode body 20 shown in FIG. 1. The cathode 21, the anode 22, the separator 23, and the electrolyte which constitute the secondary battery are described in order below with reference to FIG. 2.

Cathode

The cathode 21 has a structure, for example, in which cathode active material layers 21B are provided on both surfaces of a cathode current collector 21A. Although not shown in the drawing, the cathode active material layer 21B may be provided on only one of the surfaces of the cathode current collector 21A. The cathode current collector 21A is composed of, for example, a metal foil such as an aluminum foil or the like. The cathode active material layer 21B contains, as a cathode active material, at least one type of cathode material capable of occluding and releasing lithium, and further contains a conductive agent such as graphite or the like and a binder such as poly(vinylidene fluoride) or the like according to demand.

Figure 3:
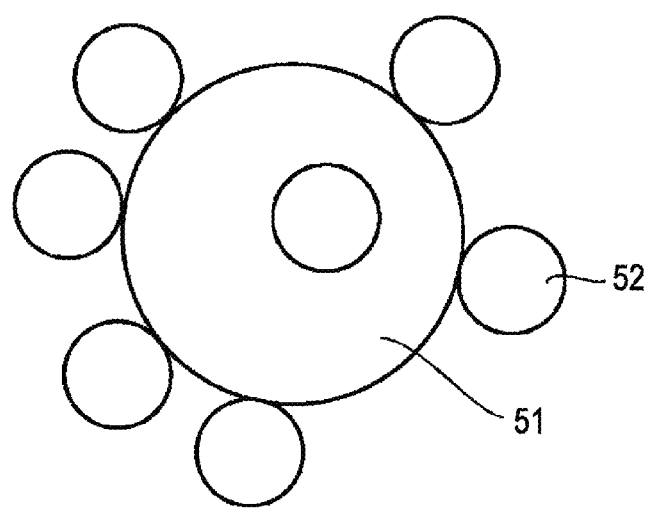
FIG. 3 is a schematic view showing a configuration example of a composite particle contained in a cathode active material according to the first embodiment.

FIG. 3 is a schematic view showing a configuration example of a composite particle contained in a cathode active material according to the first embodiment. As shown in FIG. 3, the composite particle includes a core particles (first particle) 51 and fine particles (second particles 52) provided to coat the core particles 51 so as to be scattered in at least a portion of the surface of the core particle 51. The core particles 51 and the fine particles 52 contain a cathode material capable of occluding and releasing the electrode reaction material. The materials of the core particles 51 and the fine particles 52 are not limited to the same cathode material and may be different cathode materials.

Figure 4A:
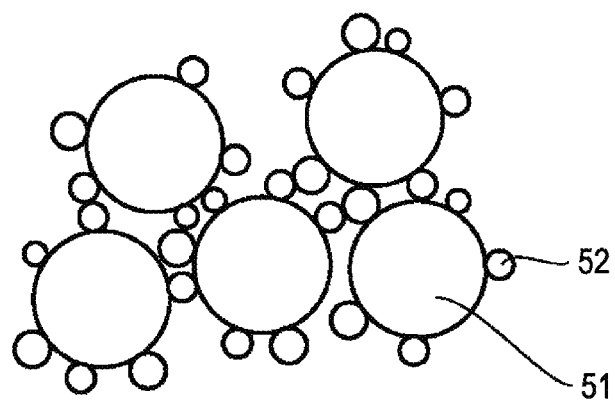
FIGS. 4A and 4B are schematic views each showing an example of a state of composite particles during compression-forming of a cathode active material layer.
Figure 4B:
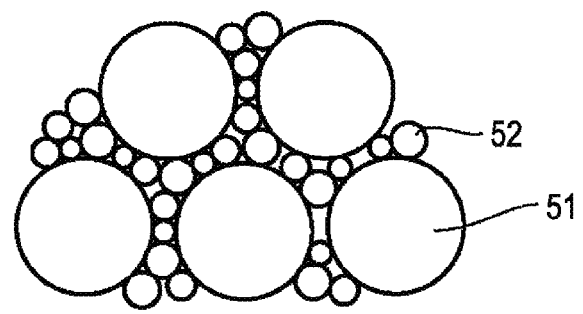

FIGS. 4A and 4B are schematic views each showing an example of a state of composite particles during compression-forming of the cathode active material layer 21B. In a process for forming en electrode as described below, when the cathode active material layer containing composite particles in the state shown in FIG. 4A is compression-formed, the fine particles 52 are separated from the core particles 51 and filled in gaps between the core particles 51. Therefore, in the cathode active material layer according to the first embodiment, the filling properties and discharging capacity may be improved. In addition, when the fine particles 52 are filled in the gaps between the core particles as described above, the occurrence of cracks in the core particles is suppressed during compression-forming of the cathode active material layer. Therefore, it may be possible to suppress an increase in specific surface area and a decrease in capacity retention.

The average particle diameter of the core particles is preferably 10 μm to 30 μm. When the average particle diameter of the core particles is less than 10 the sufficient filling properties tend not to be achieved when an electrode is formed. On the other hand, when the average particle diameter of the core particles exceeds 30 load characteristics tend to decrease when a battery is formed. The average particle diameter of the fine particles is preferably 0.1 μm to 10 When the average particle diameter of the fine particles is less than 0.1 μm, the specific surface area increases, and cycle characteristics tend to decrease. On the other hand, when the average particle diameter of the fine particles exceeds 10 the effect of improving the filling properties tends to deteriorate when aggregates are formed.

The circularity of the composite particles is preferably 0.800 to 0.950. When the circularity is less than 0.800, the effect of improving the filling properties tends to decrease during pressing. When the circularity exceeds 0.950, shape stability is enhanced during compression-forming of the cathode active material layer, and the coating fine particles are not separated from the surfaces of the core particles, thereby causing the tendency that the filling properties are not increased.

The particle diameter ratio r1/r2 of the average particle diameter r1 of the fine particles to the average particle diameter r2 of the core particles is preferably 1/20 to 1/2. When the particle diameter ratio r1/r2 is less than 1/20, the sufficient filling properties tend not to be achieved. When the particle diameter ratio r1/r2 exceeds 1/2, the fine particles are not separated from the surfaces of the core particles, thereby causing the tendency that the filling properties are not increased.

The molar ratio of core particles to fine particles is preferably 1:1 to 1:30. When the molar ratio of the fine particles is less than 1:1, the filling properties and load characteristics tend to decrease. When the molar ratio of the fine particles exceeds 1/30, the filling properties and cycle characteristics tend to decrease.

The specific surface area is preferably 0.1 m²/g to 0.5 m²/g. When the specific surface area is less than 0.1 m²/g, the contact portion with the electrolyte solution is small, and the sufficient capacity tends not to be achieved. On the other hand, when the specific surface area exceeds 0.5 m²/g, deterioration of the electrolyte solution is promoted, and the cycle characteristics tend to decrease. Here, the specific surface area is the specific surface area of a mixture of the core particles and the fine particles in a state after coating.

As the cathode material capable of occluding and releasing the electrode reaction material, a compound which capable of occluding and releasing lithium is preferred. Specifically, proper examples of the cathode material include lithium-containing compounds such as lithium oxide, lithium phosphorous oxide, lithium sulfide, lithium-containing intercalation compounds, and the like. These may be used as a mixture of two or more. In order to increase the energy density, lithium-containing transition metal oxides containing at least lithium (Li) and at least one transition metal element are preferred. Among these, lithium-containing compounds having a layer structure, such as lithium cobaltate, lithium nickelate, nickel-cobalt-manganese composite lithium oxide, and the like, are more preferred from the viewpoint of higher capacity. In particular, lithium cobaltate-containing transition metal oxides mainly composed of lithium cobaltate are preferred because they have high filling properties and discharging voltage. The lithium cobaltate-containing transition metal oxides may be substituted by at least one element selected from Groups II to XV in the periodic table or may be fluorinated.

Examples of such lithium-containing compounds include lithium compound oxides having a bedded salt-type structure represented by formula (1), (2), or (3), lithium compound oxides having a spinel-type structure represented by formula (4), lithium compound phosphates having a olivine-type structure represented by formula (5), specifically formula (6), and the like. More specifically, $LiNi_{0.50}Co_{0.20}Mn_{0.30}O_2$, $Li_aCoO_2$ (a≠1), $Li_bNiO_2$ (b≠1), $Li_{c1}Ni_{c2}CO_{1-c2}O_2$ (c1≠1, 0<c2<1), $Li_dMn_2O_4$ (d≠1), and $Li_eFePO_4$ (e≠1), and the like are given.

$$Li_pNi_{(1-q-r)}Mn_qM1_rO_{(2-y)}X_z \qquad (1)$$

wherein M1 represents at least one element selected from Groups II to XV in the periodic table excluding nickel (Ni) and manganese (Mn), X represents at least one element of Groups XVI and XVII in the periodic table excluding oxygen (O), p, q, r, y, and z are values within the ranges of 0≤p≤1.5, 0≤q≤1.0, 0≤r≤1.0, −0.10≤y≤0.20, and 0≤z≤0.2, respectively, a lithium composition depends on a state of charging and discharging, and a value of p indicates a value in a state of full discharging.

$$Li_aCo_{(1-b)}M2_bO_{(2-c)} \qquad (2)$$

wherein M2 represents at least one element selected from the group including vanadium (V), copper (Cu), zirconium (Zr), zinc (Zn), magnesium (Mg), aluminum (Al), gallium (Ga), yttrium (Y), and iron (Fe), a, b, and c are values within the ranges of 0.9≤a≤1.1, 0≤b≤0.3, and −0.1≤c≤0.1, respectively, a lithium composition depends on a state of charging and discharging, and a value of a indicates a value in a state of full discharging.

$$Li_wNi_xCo_yMn_zM3_{(1-x-y-z)}O_{(2-v)} \qquad (3)$$

wherein M3 represents at least one element selected from the group including vanadium (V), copper (Cu), zirconium (Zr), zinc (Zn), magnesium (Mg), aluminum (Al), gallium (Ga), yttrium (Y), and iron (Fe), v, w, x, y, and z are values within the ranges of −0.1≤v≤0.1, 0.9≤w≤1.1, 0<x<1, 0<y<1, 0<z<0.5, 0≤1−x−y−z, respectively, a lithium composition depends on a state of charging and discharging, and a value of w indicates a value in a state of full discharging.

$$Li_pMn_{(2-q)}M4_qO_rF_s \qquad (4)$$

wherein M4 represents at least one element selected from the group including cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), p, q, r, and s are values within the ranges of 0.9≤p≤1.1, 0≤q≤0.6, 3.7≤r≤4.1, and 0≤s≤0.1, respectively, a lithium composition depends on a state of charging and discharging, and a value of p indicates a value in a state of full discharging.

$$Li_aM5_bPO_4 \qquad (5)$$

wherein M5 represents at least one element selected from Groups II to XV in the periodic table, a and b are values within the ranges of 0≤a≤2.0 and 0.5≤b≤2.0, respectively, a lithium composition depends on a state of charging and discharging, and a value of a indicates a value in a state of full discharging.

$$Li_tM6PO_4 \qquad (6)$$

wherein M6 represents at least one element selected from the group including cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), t is a value within the range of $0.9 \leq t \leq 1.1$, a lithium composition depends on a state of charging and discharging, and a value of t indicates a value in a state of full discharging.

For these particles, a commercially available cathode active material may be used as a starting material. In some cases, the cathode active material may be used after secondary particles are disintegrated using a ball mill, a grinder, or the like.

In addition, at least one element different from a main transition metal element contained in the core particles is preferably present on at least a portion of the surface of each of the core particles. This is because higher electrochemical stability may be obtained. In addition, the at least one element is preferably present on the surfaces of the core particles, not in the core particles, because reaction at a solid-liquid interface is the most important reaction as a battery, and the battery characteristics are greatly affected by the surface composition of the core particles. The core particles are prepared by, for example, coating the surfaces of the core particles with an element different from the main transition metal constituting the lithium compound oxide contained in the core particles. As the element different from the main transition metal, at least one of nickel (Ni), manganese (Mn), magnesium (Mg), fluorine (F), and phosphorous (P) is preferably used. The main transition metal constituting the lithium compound oxide particles represents the transition metal at the highest ratio among the transition metals constituting the core particles. For example, when lithium cobaltate with mean composition $LiCO_{0.98}Al_{0.01}Mg_{0.01}O_2$ is used as the lithium compound oxide, the main transition metal is cobalt (Co). In this case, the core particles are preferably coated with nickel (Ni), manganese (Mn), phosphorous (P), or the like. In addition, like the surfaces of the core particles, at least one element different from the main transition metal element contained in the fine particles may be present on at least a portion of the surface of each of the fine particles. The reason why the at least one element is preferably present on the surfaces of the fine particles, not in the fine particles, is the same as described above for the core particles.

Besides the above-described materials, for example, oxides such as titanium oxide, vanadium oxide, manganese oxide, and the like, disulfides such as iron disulfide, titanium disulfide, molybdenum disulfide, and the like, chalcogenides such as niobium selenide and the like, sulfur, conductive polymers such as polyaniline, polythiophene, and the like may be used as the cathode material capable of occluding and releasing the electrode reaction material.

Anode

The anode 22 has, for example, a structure in which anode active material layers 22B are provided on both surfaces of an anode current collector 22A. Although not shown in the drawing, the anode active material layer 22B may be provided on one of the surfaces of the anode current collector 22A. The anode current collector 22A includes a metal foil, for example, a copper foil or the like.

The anode active material layer 22B includes, as an anode active material, at least one anode material capable of occluding and releasing lithium, and includes the same binder as in the cathode active material layer 21B according to demand. In the secondary battery, the electrochemical equivalent of the anode material capable of occluding and releasing lithium is larger than that of the cathode 21 so that lithium metal is not deposited on the anode 22 during charging.

Examples of the anode material capable of occluding and releasing lithium include carbon materials such as nongraphitizable carbon, graphitizable carbon, graphite, pyrolytic carbon, cokes, glassy carbon, organic high-polymer compound burned products, carbon fibers, activated carbon, and the like. Among these, the cokes include pitch coke, needle coke, petroleum coke, and the like. The organic high-molecular compound burned products are produced by carbonizing by burning high-molecular materials, such as phenol resin, furan resin, or the like, at an appropriate temperature. Some of the organic high-molecular compound burned products are classified in nongraphitizable carbon or graphitizable carbon. The high-molecular materials include polyacetylene, polypyrrole, and the like. These carbon materials are preferred because changes in crystal structures during charging and discharging are very small, and high charging/discharging capacity and good cycle characteristics may be achieved. In particular, graphite is preferred because the electrochemical equivalent is large, and a high energy density may be achieved. In addition, the nongraphitizable carbon is preferred because excellent characteristics are obtained. Further, materials having a low charging/discharging potential, specifically a charging/discharging potential close to lithium metal, are preferred because a higher energy density of a battery may be easily realized.

As the anode material capable of occluding and releasing lithium, materials capable of occluding and releasing lithium and containing at least one element of metal elements and semimetal elements as a constituent element may be used. This is because a high energy density may be obtained using such materials. In particular, combination with a carbon material is more preferred because a high energy density and good cycle characteristics may be achieved. The anode material may be composed of a metal element or semimetal element or an alloy or compound thereof, or may contain at least a phase portion of at least one element, alloy, or compound. In the present application, an alloy may be composed of at least two metal elements or at least one metal element and at least one semimetal element, or may contain a nonmetal element. The structure is a solid solution, a eutectic (eutectic mixture), an intermetallic compound, or a structure in which at least two of these coexist.

Examples of a metal element or semimetal element constituting the anode material include magnesium (Mg), boron (B), aluminum (Al), gallium (Ga), indium (In), silicon (Si), germanium (Ge), tin (Sn), zinc (Pb), bismuth (Bi), cadmium (Cd), silver (Ag), zinc (Zn), hafnium (Hf), zirconium (Zr), yttrium (Y), palladium (Pd), and platinum (Pt). These elements may be crystalline or amorphous.

In particular, as the anode material, materials containing a group IVB metal element or semimetal element in the short-period periodic table as a constituent element, particularly at least one of silicon (Si) and tin (Sn) as a constituent element, are preferred. This is because silicon (Si) and tin (Sn) have the high ability to occlude and release lithium (Li) and are capable of achieving a high energy density.

Examples of an alloy of tin (Sn) include alloys each containing, as a second constituent element other than tin (Sn), at least one of the group including silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of an alloy of silicon (Si) include alloys each containing, as a second constituent element other than silicon (Si), at least one of the group including tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of a compound of tin (Sn) or a compound of silicon (Si) include compounds containing oxygen (O) or carbon (C), which may contain the above-described second constituent element in addition to tin (Sn) or silicon (Si).

Further examples of the anode material capable of occluding and releasing lithium include other metal compounds and high-molecular materials. The other metal compounds include oxides such as $MnO_2$, $V_2O_5$, $V_6O_{13}$, and the like, sulfides such as NiS, MoS, and the like, and lithium nitrides such as $LiN_3$ and the like. The high-molecular materials include polyacetylene, polyaniline, polypyrrole, and the like.

Electrolyte

As the electrolyte, any one of a nonaqueous electrolyte solution containing an electrolyte salt dissolved in a nonaqueous solvent, a solid electrolyte containing an electrolyte salt, and a gel electrolyte including an organic polymer impregnated with a nonaqueous solvent and an electrolyte salt may be used.

The nonaqueous electrolyte solution is prepared by appropriately combining an organic solvent and an electrolyte. Any organic solvent may be used as long as it is used for such a type of battery. Examples of the organic solvent include propylene carbonate, ethylene carbonate, diethylene carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetic acid esters, butyric acid esters, propionic acid esters, and the like.

As the solid electrolyte, any one of inorganic solid electrolytes and high-molecular solid electrolytes may be used as long as it is a material having lithium-ion conductivity. Examples of the inorganic solid electrolytes include lithium nitride, lithium iodide, and the like. The high-molecular solid electrolytes contain, for example, an electrolyte salt and a high-molecular compound which dissolves it. Examples of the high-molecular compound include ether polymers such as poly(ethylene oxide) and the like, poly(methacrylate) esters, acrylates, and the like. These compounds may be used alone or as a copolymer molecule or a mixture.

As a matrix of the gel electrolyte, any one of various polymers may be used as long as a polymer is gelled by absorbing the nonaqueous electrolyte solution. Usable examples include fluorocarbon polymers such as poly(vinylidene fluoride), poly(vinylidene fluoride-co-hexafluoropropylene), and the like, ether polymers such as poly(ethylene oxide) and crosslinked products thereof, and the like, poly(acrylonitrile), and the like. In particular, fluorocarbon polymers are preferably used from the viewpoint of oxidation-reduction stability. Ionic conductivity is imparted by adding the electrolyte salt.

As the electrolyte salt, any electrolyte salt which is used for this type of battery may be used. Examples include lithium salts such as $LiClO_4$, $LiAsF_6$, $LiPF_6$, $LiBF_4$, $LiB(C_6H_5)_4$, $CH_3SO_3L_1$, $CF_3SO_3Li$, LiCl, LiBr, and the like. These lithium salts may be used alone or as a mixture of two or more.

Separator

The separator 23 separates between the cathode 21 and the anode 22 and transmits lithium ions while preventing current short-circuiting due to contact between both electrodes. As the separator 23, for example, a porous film made of a synthetic resin such as polytetrafluoroethylene polypropylene, or polyethylene, a ceramic porous film, or a laminate of a plurality of such porous films may be used. In particular, as the separator 23, a polyolefin porous film is preferred because of the excellent short-circuit preventing effect and the shutdown effect of improving battery safety. In addition, as the separator 23, a porous resin layer of poly(vinylidene fluoride) (PVdF) or polytetrafluoroethylene (PTFE) on which a polyolefin microporous film is formed may be used.

Method for Manufacturing Battery

Next, an example of a method for manufacturing the nonaqueous electrolyte secondary battery according to the first embodiment is described.

First, core particles and fine particles provided to coat the core particles are mixed at a predetermined ratio. Next, the resultant mixture is burned in, for example, air, and then ground to prepare composite particles including the core particles coated so that the fine particles are scattered on the surfaces of the core particles. The burning temperature (heat treatment temperature) is preferably 500° C. to 1500° C. When the temperature is lower than 500° C., coating is not sufficiently made, causing the tendency to degrade the effect of improving filling properties. On the other hand, when the temperature exceeds 1500° C., the bonding strength of coating is excessively increased, and thus the coating particles are not satisfactorily separated or are cracked during pressing, causing the tendency to degrade the effect of improving filling properties.

Next, for example, a cathode active material, a conductive agent, and a binder are mixed to prepare a cathode mixture, and the resultant cathode mixture is dispersed in a solvent such as N-methyl-2-pyrrolidone to prepare a paste-like cathode mixture slurry. Next, the cathode mixture slurry is applied to the cathode current collector 21A, dried to remove the solvent, and then compression-formed with a roll pressing machine to form the cathode active material layer 21B, forming the cathode 21. The pressure of compression forming is preferably 50 $N/mm^2$ to 250 $N/mm^2$. When the pressure is less than 50 $N/mm^2$, the fine particles (second particles) are not separated, and the filling properties tend not to be improved. On the other hand, when the pressure exceeds 250 $N/mm^2$, the filling properties tend not to be further improved.

In addition, for example, an anode active material and a binder are mixed to prepare an anode mixture, and the resultant anode mixture is dispersed in a solvent such as N-methyl-2-pyrrolidone to prepare a paste-like anode mixture slurry. Next, the anode mixture slurry is applied to the anode current collector 22A, dried to remove the solvent, and then compression-formed with a roll pressing machine to form the anode active material layer 22B, forming the anode 22.

Next, the cathode lead 25 is provided on the cathode current collector 21A by welding or the like, and the anode lead 26 is provided on the anode current collector 22A by welding or the like. Next, the cathode 21 and the anode 22 are wound with the separator 23 provided therebetween. Next, the end of the cathode lead 25 is welded to the safety valve mechanism 15, the end of the anode lead 26 is welded to the battery can 11, and the wound cathode 21 and anode 22 are sandwiched between a pair of insulating plates 12 and 13 and housed in the battery can 11. After the cathode 21 and the anode 22 are housed in the battery can 11, an electrolyte is injected into the battery can 11 and impregnated into the separator 23. Next, the battery cover 14, the safety valve mechanism 15, and the heat-sensitive resistor element 16 are fixed to the open end of the battery can 11 by caulking through the sealing gasket 17. As a result, the secondary battery shown in FIG. 1 is obtained.

In the secondary battery according to the first embodiment, lithium ions are released from the cathode active material layer 21B by charging, and are occluded, through the electrolyte such as the electrolyte solution, by the anode material contained in the anode active material layer 22B, the anode material being capable of occluding and releasing lithium. Next, when discharging, the lithium ions occluded in the anode material contained in the anode active material layer 22B are released and occluded by the cathode active material layer 21B through the electrolyte such as the electrolyte solution, the anode material being capable of occluding and releasing lithium.

In the first embodiment, the fine particles are scattered on the peripheries of the core particles to form the composite particles. When the cathode active material layer containing the composite particles is compression-formed, the fine particles are separated from the surfaces of the core particles, and the pressing pressure is absorbed to suppress cracking of the core particles. In addition, the separated fine particles are filled in the gaps between the core particles. Therefore, high-density filling is achieved at a void ratio of 20% or less as compared with a usual cathode active material using aggregates or a dispersion (non-aggregate) of particles having a single particle diameter. In addition, a reaction surface is secured, and thus a nonaqueous electrolyte secondary battery having high capacity and high cycle characteristics may be obtained. When a compound capable of occluding and releasing lithium is used as the cathode material and the anode material, high output characteristics and excellent cycle characteristics are achieved.

2. Second Embodiment

Configuration of Battery

Figure 5:
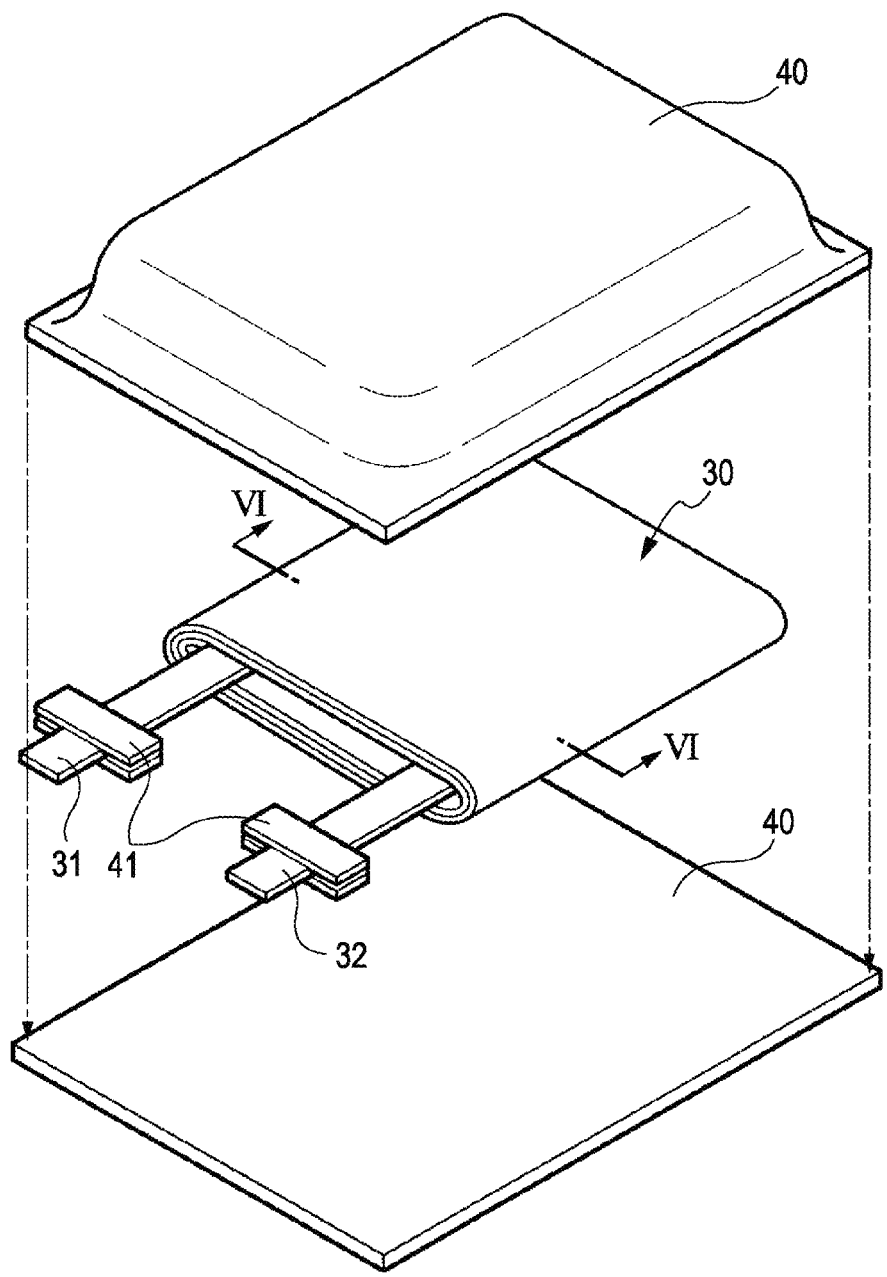
FIG. 5 is an exploded perspective view showing a configuration example of a nonaqueous electrolyte secondary battery according to a second embodiment.

FIG. 5 is an exploded perspective view showing a configuration example of a nonaqueous electrolyte secondary battery according to a second embodiment. The secondary battery includes a wound electrode body 30 housed in a film-shaped exterior member 40, a cathode lead 31 and an anode lead 32 being provided on the wound electrode body 30, thereby permitting reduction in size, weight, and thickness.

The cathode lead 31 and the anode lead 32 are led out from the inside of the exterior member 40 to the outside, for example, in the same direction. Each of the cathode lead 31 and the anode lead 32 is composed of, for example, a metal material such as aluminum, copper, nickel, stainless steel, or the like, and has a thin-sheet shape or network shape.

The exterior member 40 is composed of, for example, a rectangular aluminum laminate film including a nylon film, an aluminum foil, and a polyethylene film which are laminated in that order. The exterior member 40 is disposed, for example, so that the polyethylene film side faces the wound electrode body 30, and the edge portions are closely adhered to each other by fusing or using an adhesive. In addition, an adhesive film 41 is inserted between the exterior member 40 and each of the cathode lead 31 and the anode lead 32 in order to prevent entering of the outside air. The adhesive film 41 is composed of a material having adhesiveness to the cathode lead 31 and the anode lead 32, for example, a polyolefin resin such as polyethylene, polypropylene, modified polyethylene, modified polypropylene, or the like.

The exterior member 40 may be composed of a laminate film having another structure, a polymer film of polypropylene or the like, or a metal film instead of the above-described aluminum laminate film.

Figure 6:
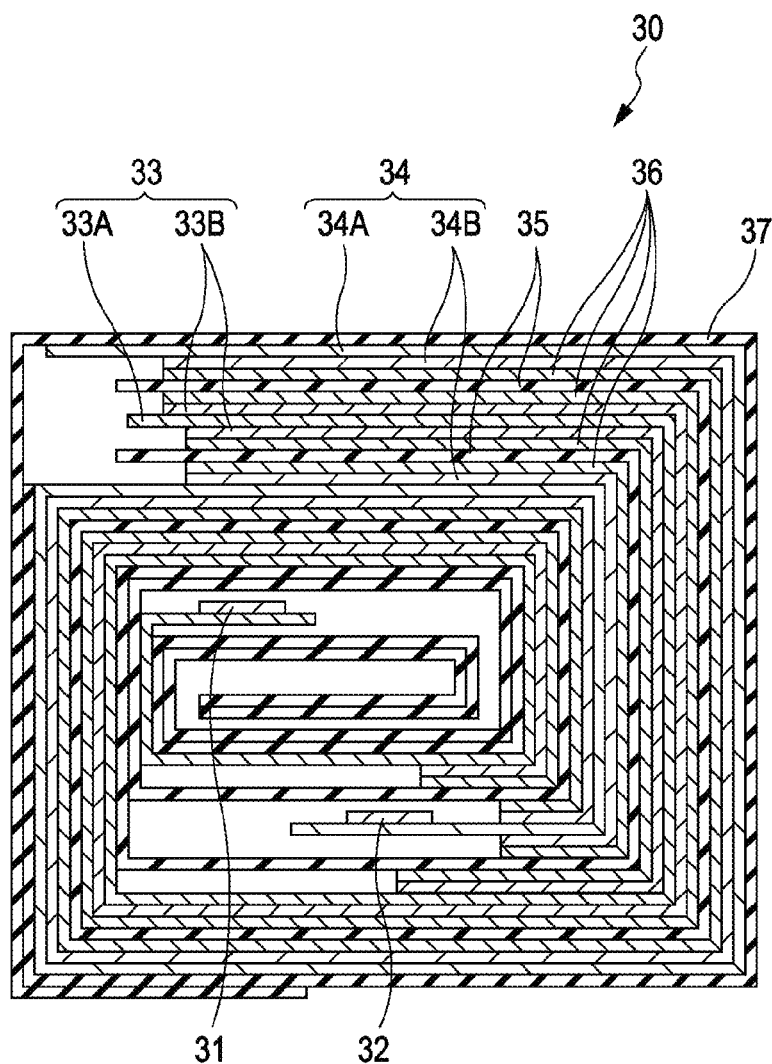
FIG. 6 is a sectional view showing a sectional structure of a wound electrode body taken along line VI-VI in FIG. 5.

FIG. 6 is a sectional view of the wound electrode body 30 shown in FIG. 5, taken along line VI-VI in FIG. 5. The wound electrode body 30 is formed by laminating a cathode 33 and an anode 34 with a separator 35 and an electrolyte layer 36 provided therebetween and then winding the resultant laminate, the outermost periphery thereof being protected by a protective tape 37.

The cathode 33 has a structure in which a cathode active material layer 33B is provided on one or both surfaces of a cathode current collector 33A. The anode 34 has a structure in which an anode active material layer 34B is provided on one or both surfaces of an anode current collector 34A. The anode active material layer 34B and the cathode active material layer 33B are disposed opposite to each other. The configurations of the cathode current collector 33A, the cathode active material layer 33B, the anode current collector 34A, the anode active material layer 34B, and the separator 35 are the same as the cathode current collector 21A, the cathode active material layer 21B, the anode current collector 22A, the anode active material layer 22B, and the separator 23, respectively, in the first embodiment.

The electrolyte layer 36 includes an electrolyte solution and a high-molecular compound serving as a support which supports the electrolyte solution, and is gelled. The gelled electrolyte layer 36 is preferred because it may be possible to attain high ionic conductivity and prevent leakage of a battery solution. The configuration of the electrolyte solution (i.e., the solvent, the electrolyte salt, etc.) is the same as the secondary battery according to the first embodiment. Examples of the high-molecular compound include polyacrylonitrile, poly(vinylidene fluoride), copolymers of vinylidene fluoride and hexafluoropropylene, polytetrafluoroethylene, polyhexafluoropropylene, poly(ethylene oxide), poly(propylene oxide), polyphosphazene, polysiloxane, poly(vinyl acetate), poly(vinyl alcohol), poly(methyl methacrylate), poly(acrylic acid), poly(methacrylic acid), styrene-butadiene rubber, nitrile-butadiene rubber, polystyrene, and polycarbonate. In particular, polyacrylonitrile, poly(vinylidene fluoride), polyhexafluoropropylene, or poly(ethylene oxide) is preferred from the viewpoint of electrochemical stability.

Although the upper limit charging voltage of the secondary battery may be 4.20 V, the secondary battery is preferably designed so that the upper limit charging voltage is higher than 4.20 V. Specifically, the secondary battery is preferably designed so that the upper limit charging voltage is in a rage of 4.25 V to 4.80 V, and more preferably in a range of 4.35 V or more from the viewpoint of discharging capacity and in a range of 4.65 V or less from the viewpoint of safety. The lower limit discharging voltage is preferably 2.00 V to 3.30 V. In this way, the energy density may be increased by increasing the battery voltage.

Method for Manufacturing Battery

Next, an example of a method for manufacturing the nonaqueous electrolyte secondary battery according to the second embodiment is described.

First, a precursor solution containing a solvent, an electrolyte salt, a high-molecular compound, and a mixing solvent is applied to each of the cathode 33 and the anode 34, and then the mixing solvent is evaporated to form the electrolyte layer 36. Then, the cathode lead 31 is attached to the end of the cathode current collector 33A by welding, and the anode lead 32 is attached to the end of the anode current collector 34A by welding. Next, the cathode 33 and the anode 34 on each of which the electrolyte layer 36 is formed are laminated through the separator 35 to form a laminate. The resulting laminate is wound in a longitudinal direction, and the protective tape 37 is bonded to the outermost periphery to form the wound electrode body 30. Finally, the wound electrode body 30 is inserted into, for example, the exterior member 40, and the edge portions of the exterior member 40 are closely adhered and sealed by heat sealing. At the same time, the adhesive film 41 is inserted between the exterior member 40 and each of the cathode lead 31 and the anode lead 32. As a result, the secondary battery shown in FIGS. 5 and 6 is obtained.

The secondary battery may be formed as follows. First, the cathode 33 and the anode 34 are formed as described above, and the cathode lead 31 and the anode lead 32 are attached to the cathode 33 and the anode 34, respectively. Next, the cathode 33 and the anode 34 are laminated through the separator 35 to form a laminate. The resulting laminate is wound, and the protective tape 37 is bonded to the outermost periphery to form a wound body as a precursor of the wound electrode body 30. Then, the wound body is inserted into, for example, the exterior member 40, and the edge portions of the exterior member 40, excluding one side, are heat-sealed to form a bag which houses the wound body 40. Next, an electrolyte composition containing a solvent, an electrolyte salt, a monomer as a raw material of a high-molecular compound, a polymerization initiator, and according to demand, other materials such as a polymerization inhibitor and the like is prepared and injected into the exterior member 40.

After the electrolyte composition is injected, the opening of the exterior member 40 is sealed by heat sealing in a vacuum atmosphere. Next, the monomer is polymerized by heating to form the high-molecular compound, thereby forming the gelled electrolyte layer 36. As a result, the secondary battery shown in FIG. 5 is obtained.

The operation and advantage of the nonaqueous electrolyte secondary battery according to the second embodiment are the same as the nonaqueous electrolyte secondary battery according to the first embodiment.

EXAMPLES

Although the present application is described in detail below with reference to examples, the present application is not limited to these examples.

In the examples, the conditions and physical quantities of particles were determined as follows:

Particle Coating and Coating State

Whether or not core particles were coated with fine particles was confirmed by observation with a scanning electron microscope (manufactured by JEOL, Ltd., trade name: JEOL Scanning Electron Microscopes). The confirmation results of coating are shown by a circle mark and a cross mark in Table 1. A circle mark and a cross mark represent the following confirmation results:

○: With coating
x: Without coating

Circularity

The circularity of particles was determined using a flow particle image analyzer (manufactured by Sysmex Co., Ltd., trade name: Flow Particle Image Analyzer FPIA). The circularity was an average of 20 projections of 3000 to 4000 particles. The circularity was determined by the following equation:

Circularity=boundary length of corresponding circle/boundary length of projected image of particles Average Particle Diameter The average particle diameter of particles was measured by a laser diffraction scattering method. As a measuring apparatus, a particle size distribution measuring apparatus (manufactured by HORIBA Instruments, Inc., trade name: Laser Diffraction/Scattering Particle Size Distribution Analyzer) was used.

Specific Surface Area

The specific surface area of particles was measured by a single-point BET method. As a measuring apparatus, a specific surface meter (manufactured by Mountech Co., Ltd., trade name: full-automatic BET specific surface analyzer Macsorb) was used.

(Filling Rate after Pressing)

The prepared composite particles were mixed with 1% of cellulose, and the resultant mixture was pressed with a pressing jig with a diameter of 15.5 mm at 150 $N/mm^2$ to form pellets. The filling rate (pellet density method) was calculated from the weight and thickness of the pellet.

Particle Diameter after Pressing

Only the prepared composite particles were pressed with a pressing jig at 150 $N/mm^2$, and a powder was taken out and measured for the particle size distribution. As a measuring apparatus, a particle size distribution measuring apparatus (manufactured by HORIBA Instruments, Inc., trade name: Laser Diffraction/Scattering Particle Size Distribution Analyzer) was used.

Circularity after Pressing

Only the prepared composite particles were pressed with a pressing jig at 150 $N/mm^2$, and a powder was taken out and measured for circularity. The circularity of particles was determined using a flow particle image analyzer (manufactured by Sysmex Co., Ltd., trade name: Flow Particle Image Analyzer FPIA).

Particle Size Distribution

The particle size distribution was measured using a particle size distribution measuring apparatus (manufactured by HORIBA Instruments, Inc., trade name: Laser Diffraction/Scattering Particle Size Distribution Analyzer). Measurement was performed after ultrasonic dispersion of a small amount of powder charged directly in the analyzer.

Presence of Crack

Whether or not cracks occurred in particles was confirmed by observing, with a scanning electron microscope (manufactured by JEOL, Ltd., trade name: JEOL Scanning Electron Microscopes), a section of an electrode formed by pressing.

Example 1

Figure 7:
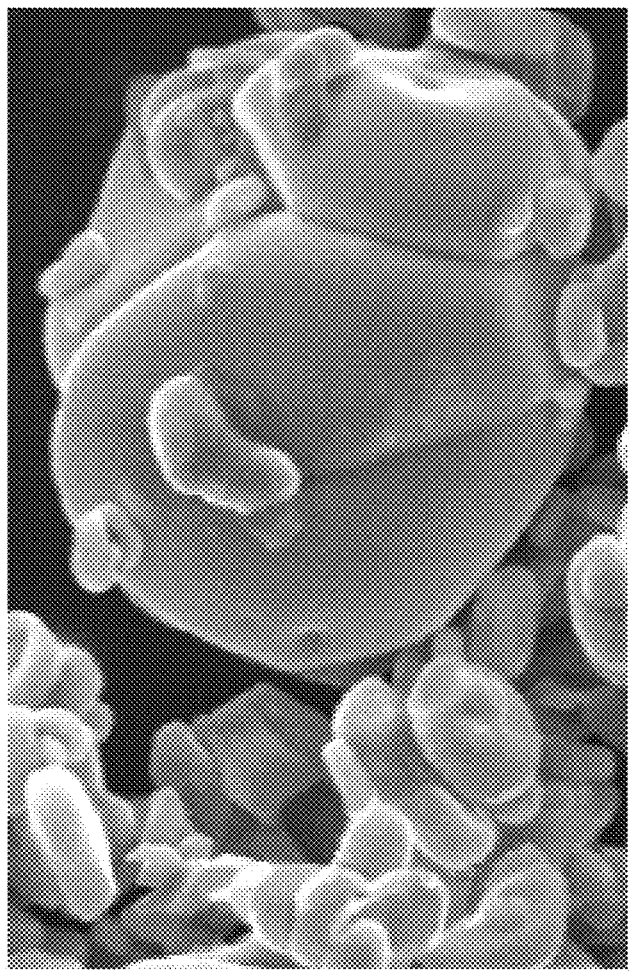
FIG. 7 is a SEM photograph of composite particles of Example 1.

A cathode active material was prepared as follows: First, cobalt carbonate and lithium carbonate were mixed at a molar weight ratio Li/Co of 1:1 to prepare $LiCoO_2$ core particles having an average particle diameter of 22.1 Next, the prepared $LiCoO_2$ core particles and $LiCoO_2$ fine particles having an average particle diameter of 6.1 which were used for coating the surfaces of the core particles, were charged at a mass ratio of 3:1 in a particle composing apparatus provided with a stirring blade made of stainless steel and sufficiently mixed. Next, the resultant mixture was burned in air at 900° C. for 4 hours and then ground to produce coating-type composite particles with a circularity of 0.901. The specific surface area of the mixture was 0.19 $m^2/g$. FIG. 7 shows a SEM photograph of the composite particles. FIG. 7 indicates that the $LiCoO_2$ fine particles are scattered on the surfaces of the $LiCoO_2$ core particles.

Figure 8:
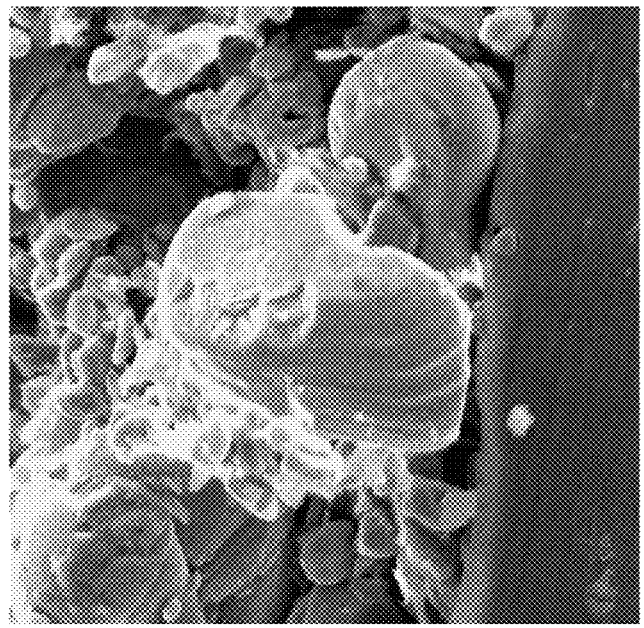
FIG. 8 is a SEM photograph of composite particles showing a state of $LiCoO_2$ core particles after compression-forming of a cathode active material layer of Example 2.

Next, a cathode was formed using the prepared composite particles as a cathode active material as follows: First, 95% by mass of $LiCoO_2$ composite particles, 2% by mass of graphite as a conductive agent, and 3% by mass of poly(vinylidene fluoride) were mixed to prepare a cathode mixture, and the mixture was dispersed in N-methyl-2-pyrrolidone to prepare a cathode mixture slurry. The resultant cathode mixture slurry was applied on both surfaces of an aluminum foil serving as a cathode current collector, dried, and then compression-formed with a roller pressing machine to form a cathode active material layer, forming a strip-shaped cathode. In this case, the pressing pressure was 150 N/m². FIG. 8 shows a SEM photograph of the core particles after compression-forming of the cathode active material layer.

An anode active material was prepared as follows: First, petroleum pitch was used as a starting material, and oxygen-containing functional groups were introduced (oxygen crosslinking) at 20 to 20% into the pitch, followed by burning in an inert gas at a temperature of 1000° C. As a result, a nongraphitizable carbon material having properties close to those of a glassy carbon material was obtained.

Next, an anode was formed using the prepared nongraphitizable carbon material as an anode active material as follows: First, 97% by mass of the carbon material and 3% by mass of poly(vinylidene fluoride) as a binder were mixed to prepare an anode mixture, and the mixture was dispersed in N-methyl-2-pyrrolidone to prepare an anode mixture slurry. The resultant anode mixture slurry was applied on both surfaces of a copper foil serving as an anode current collector, dried, and then compression-formed with a roller pressing machine to form a strip-shaped anode.

The strip-shaped anode and cathode formed as described above were laminated with a microporous polypropylene film serving as a separator provided therebetween, the film having a thickness of 25 μm. Then the resultant laminate was wound several times to prepare a wound electrode body. Next, the wound electrode body was housed in a battery can made of nickel-plated iron, and insulating plates were disposed on the upper and lower surfaces of the wound electrode body. Then, in order to collect a current of the cathode and the anode, an aluminum cathode lead was led out from a cathode current collector and welded to a safety valve device having a current cutoff device, and a nickel anode lead was led out from an anode current collector and welded to the battery can. Then, an electrolyte solution containing LiPF6 at a concentration of 1 mol dissolved in a mixed solvent of 60% by volume of propylene carbonate and 50% by volume of methylethyl carbonate was injected in the battery can. Then, a battery cover and the battery can were fixed by caulking through a gasket coated with asphalt to prepare a cylindrical battery having a diameter of 18 mm and a height of 65 mm.

Evaluation of Initial Discharging Capacity and Capacity Retention

The battery formed as described above was evaluated by charging and discharging under the heavy-load discharging conditions described below. First, charging was performed under the conditions including a charging voltage of 4.25 V, a charging current of 1000 mA, and a charging time of 2.5 hours, and discharging was performed under the conditions including a discharging current of 1200 mA and a final voltage of 2.75 V to determine the initial discharging capacity. Next, charging and discharging were repeated under the above-described charging and discharging conditions, and then the discharging capacity at the 200th cycle was determined. Next, a capacity retention after 200 cycles was determined by the equation below using the discharging capacity at the first cycle and the discharging capacity at the 200th cycle. The results are shown in Table 1.

Capacity retention after 200 cycles (%)=(discharging capacity at 200th cycle/discharging capacity at 1st cycle)×100

Example 2

In order to form a cathode active material, composite particles having a circularity of 0.871 were prepared using a mixture of $LiCoO_2$ core particles having an average particle diameter of 14.5 μm and $LiCoO_2$ fine particles having an average particle diameter of 6.1 μm at a mass ratio of 4:1. A cylindrical battery was formed by the same method as in Example 1 except the above-described conditions. FIG. 8 shows a SEM photograph of the $LiCoO_2$ core particles after compression-forming of the cathode active material layer. FIG. 8 indicates that no crack occurs in the $LiCoO_2$ particles. Next, the battery characteristics were evaluated by the same method as in Example 1.

Example 3

In order to form a cathode active material, composite particles having a circularity of 0.899 were prepared using a mixture of $LiCoO_2$ core particles having an average particle diameter of 12.9 μm and $LiCoO_2$ fine particles having an average particle diameter of 4.6 μm at a mass ratio of 3:1. A cylindrical battery was formed by the same method as in Example 1 except the above-described conditions. Next, the battery characteristics were evaluated by the same method as in Example 1.

Example 4

In order to form a cathode active material, composite particles having a circularity of 0.942 were prepared using a mixture of $LiCoO_2$ core particles having an average particle diameter of 15.1 μm and $LiCoO_2$ fine particles having an average particle diameter of 4.3 μm at a mass ratio of 3:1. A cylindrical battery was formed by the same method as in Example 1 except the above-described conditions. Next, the battery characteristics were evaluated by the same method as in Example 1.

Example 5

In order to form a cathode active material, composite particles having a circularity of 0.936 were prepared using a mixture of $LiCoO_2$ core particles having an average particle diameter of 22.1 μm and $LiCoO_2$ fine particles having an average particle diameter of 6.1 μm at a mass ratio of 2:1. A cylindrical battery was formed by the same method as in Example 1 except the above-described conditions. Next, the battery characteristics were evaluated by the same method as in Example 1.

Example 6

In order to form a cathode active material, composite particles having a circularity of 0.876 were prepared using a mixture of $LiCoO_2$ core particles having an average particle diameter of 14.5 μm and $LiCoO_2$ fine particles having an average particle diameter of 6.1 μm at a mass ratio of 4:1. In addition, when the composite particles were formed, the surfaces of the composite particles were coated with 1 wt % of Mg. A cylindrical battery was formed by the same method as in Example 1 except the above-described conditions. Next, the battery characteristics were evaluated by the same method as in Example 1.

Example 7

A cylindrical battery was formed by the same method as in Example 6. Next, the battery characteristics were evaluated by the same method as in Example 6 except that the charging voltage was 4.35 V.

Example 8

A cylindrical battery was formed by the same method as in Example 6. Next, the battery characteristics were evaluated by the same method as in Example 6 except that the charging voltage was 4.40 V.

Example 9

A cylindrical battery was formed by the same method as in Example 6. Next, the battery characteristics were evaluated by the same method as in Example 6 except that the charging voltage was 4.20 V.

Comparative Example 1

$LiCoO_2$ particles having an average particle diameter of 10.5 μm were aggregated as primary particles to form aggregates having a circularity of 0.931. A cylindrical battery was formed by the same method as in Example 1 except that the aggregates were used as a cathode active material. Next, the battery characteristics were evaluated by the same method as in Example 1.

Comparative Example 2

Figure 9:
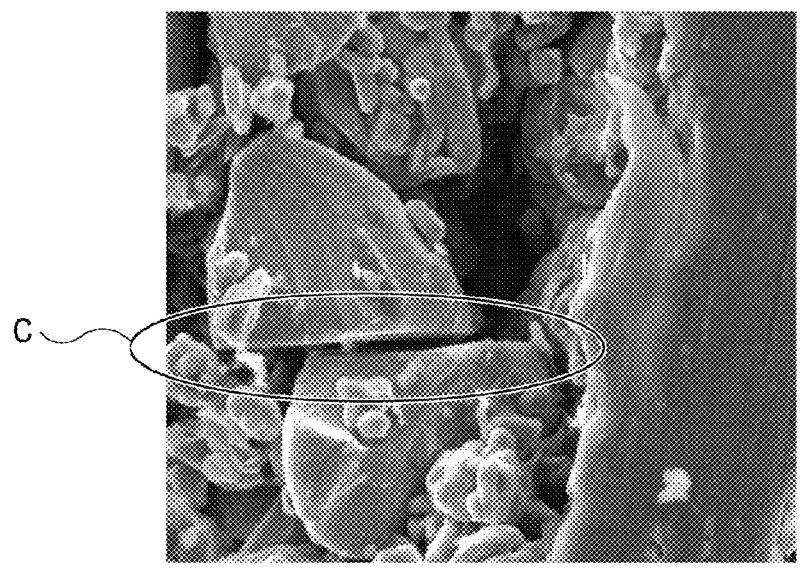
FIG. 9 is a SEM photograph of composite particles showing a state of $LiCoO_2$ core particles after compression forming of a cathode active material layer of Comparative Example 2.

A mixture having a circularity of 0.955 was prepared by mixing $LiCoO_2$ particles having an average particle diameter of 14.5 μm and $LiCoO_2$ particles having an average particle diameter of 6.1 μm at a mass ratio of 4:1. A cylindrical battery was formed by the same method as in Example 1 except the mixture was used as a cathode active material. FIG. 9 shows a SEM photograph of the $LiCoO_2$ particles after compression-forming of the cathode active material layer. FIG. 9 indicates that cracks occur in the $LiCoO_2$ particles having an average particle diameter of 14.5 μm. In FIG. 9, a cracked portion of the $LiCoO_2$ particles is shown by circle C. Next, the battery characteristics were evaluated by the same method as in Example 1.

Comparative Example 3

Composite particles having a circularity of 0.951 were prepared by aggregating fine particles having an average particle diameter of 4.3 μm on the peripheries of $LiCoO_2$ core particles having an average particle diameter of 15.1 μm. A cylindrical battery was formed by the same method as in Example 1 except that the composite particles were used as a cathode active material. Next, the battery characteristics were evaluated by the same method as in Example 1.

Comparative Example 4

A cylindrical battery was formed by the same method as in Example 1 except that $LiCoO_2$ particles (primary particles) having an average particle diameter of 6.1 μm and a circularity of 0.929 were used as a cathode active material. Next, the battery characteristics were evaluated by the same method as in Example 1.

Comparative Example 5

Composite particles having a circularity of 0.833 were prepared by mixing $LiCoO_2$ core particles having an average particle diameter of 22.1 μm with $LiCoO_2$ fine particles having an average particle diameter of 14.5 μm at a mass ratio of 4:1 and aggregating the fine particles on the peripheries of the core particles. A cylindrical battery was formed by the same method as in Example 1 except that the resultant composite particles were used as a cathode active material. Next, the battery characteristics were evaluated by the same method as in Example 1.

Comparative Example 6

Composite particles having a circularity of 0.787 were prepared by mixing $LiCoO_2$ core particles having an average particle diameter of 22.1 μm with $LiCoO_2$ fine particles having an average particle diameter of 6.1 μm at a mass ratio of 20:1 and aggregating the fine particles on the peripheries of the core particles. A cylindrical battery was formed by the same method as in Example 1 except that the resultant composite particles were used as a cathode active material. Next, the battery characteristics were evaluated by the same method as in Example 1.

Comparative Example 7

Composite particles having a circularity of 0.905 were prepared by mixing $LiCoO_2$ core particles having an average particle diameter of 22.1 μm with $LiCoO_2$ fine particles having an average particle diameter of 1.0 μm at a mass ratio of 5:1 and aggregating the fine particles on the peripheries of the core particles. A cylindrical battery was formed by the same method as in Example 1 except that the resultant composite particles were used as a cathode active material. Next, the battery characteristics were evaluated by the same method as in Example 1.

Table 1 shows the configurations of the batteries of Examples 1 to 9 and Comparative Examples 1 to 7 and the measurement results of initial discharging capacity and capacity retention.

TABLE 1

|  | Particle coating | Coating state | Circularity of composite particle [—] | Average particle diameter r2 of core particle [μm] | Average particle diameter r1 of fine particle [μm] | r1/r2 [—] | Specific surface area [m²/g] |
|---|---|---|---|---|---|---|---|
| Example 1 | ◯ | Scattered*⁾ | 0.901 | 22.1 | 6.1 | 0.28 | 0.19 |
| Example 2 | ◯ | Scattered*⁾ | 0.871 | 14.5 | 6.1 | 0.42 | 0.23 |
| Example 3 | ◯ | Scattered*⁾ | 0.899 | 12.9 | 4.6 | 0.36 | 0.24 |
| Example 4 | ◯ | Scattered*⁾ | 0.942 | 15.1 | 4.3 | 0.28 | 0.36 |
| Example 5 | ◯ | Scattered*⁾ | 0.936 | 22.1 | 6.1 | 0.28 | 0.41 |
| Example 6 | ◯ | Scattered*⁾ | 0.876 | 14.5 | 6.1 | 0.42 | 0.22 |
| Example 7 | ◯ | Scattered*⁾ | 0.876 | 14.5 | 6.1 | 0.42 | 0.22 |
| Example 8 | ◯ | Scattered*⁾ | 0.876 | 14.5 | 6.1 | 0.42 | 0.22 |
| Example 9 | ◯ | Scattered*⁾ | 0.876 | 14.5 | 6.1 | 0.42 | 0.22 |
| Comp. Example 1 | ◯ | Entire surface | 0.931 | 10.5 | — | — | 0.51 |

TABLE 1-continued

| | | | | | | | |
|---|---|---|---|---|---|---|---|
| Comp. Example 2 | X | — | 0.955 | 14.5 | 6.1 | 0.42 | 0.25 |
| Comp. Example 3 | ○ | Scattered*) | 0.951 | 15.1 | 4.3 | 0.28 | 0.56 |
| Comp. Example 4 | X | — | 0.929 | 6.1 | — | — | 0.37 |
| Comp. Example 5 | ○ | Scattered*) | 0.833 | 22.1 | 14.5 | 0.66 | 0.25 |
| Comp. Example 6 | ○ | Scattered*) | 0.787 | 22.1 | 6.1 | 0.28 | 0.29 |
| Comp. Example 7 | ○ | Scattered*) | 0.905 | 22.1 | 1.0 | 0.04 | 0.41 |

| | Filling rate after pressing at 600 kgf | Particle diameter D50 after pressing at 600 kgf | Circularity after pressing at 600 kgf | Presence of crack | Discharging capacity [mAh] | Capacity retention [%] | Voltage [V] |
|---|---|---|---|---|---|---|---|
| Example 1 | 82 | 12.8 | 0.929 | No | 2110 | 95 | 4.25 |
| Example 2 | 81 | 11.8 | 0.945 | No | 2070 | 96 | 4.25 |
| Example 3 | 80 | 11.2 | 0.935 | No | 2020 | 95 | 4.25 |
| Example 4 | 81 | 12.1 | 0.955 | No | 2050 | 95 | 4.25 |
| Example 5 | 80 | 12.8 | 0.938 | No | 2010 | 92 | 4.25 |
| Example 6 | 81 | 12.5 | 0.942 | No | 2090 | 96 | 4.25 |
| Example 7 | 81 | 12.5 | 0.942 | No | 2220 | 95 | 4.35 |
| Example 8 | 81 | 12.5 | 0.942 | No | 2280 | 90 | 4.40 |
| Example 9 | 81 | 12.5 | 0.942 | No | 1930 | 95 | 4.20 |
| Comp. Example 1 | 71 | 7.4 | 0.885 | Yes | 1880 | 85 | 4.25 |
| Comp. Example 2 | 76 | 9 | 0.892 | Yes | 1940 | 90 | 4.25 |
| Comp. Example 3 | 75 | 8.9 | 0.889 | Yes | 1920 | 83 | 4.25 |
| Comp. Example 4 | 72 | 5.1 | 0.856 | Yes | 1910 | 85 | 4.25 |
| Comp. Example 5 | 72 | 14.5 | 0.718 | Yes | 1890 | 86 | 4.25 |
| Comp. Example 6 | 76 | 14.9 | 0.790 | Yes | 1950 | 90 | 4.25 |
| Comp. Example 7 | 70 | 15.5 | 0.792 | Yes | 1920 | 81 | 4.25 |

*)Scattered on surface

Table 1 indicates the following.

In Examples 1 to 6, the fine particles are scattered on the surfaces of the core particles, the circularity is 0.800 to 0.950, and the particle diameter ratio r1/r2 of the average particle diameter r1 of the fine particles to the average particle diameter r2 of the core particles is 1/2 or less. Therefore, a high discharging capacity of 2000 mAh or more and a high capacity retention of 92% or more are obtained, and excellent battery performance is realized.

In Examples 7 and 8, like in Examples 1 to 6, the fine particles are scattered on the surfaces of the core particles, the circularity is 0.800 to 0.950, and the particle diameter ratio r1/r2 of the average particle diameter r1 of the fine particles to the average particle diameter r2 of the core particles is 1/2 or less. In addition, the battery characteristic is 4.35 V or more. Therefore, the high discharging capacity is improved without a significant decrease in capacity retention as compared with Examples 1 to 6.

In Example 9, the charging voltage is 4.20 V, and the discharging capacity is decreased as compared with Examples 1 to 6.

In Comparative Example 1, aggregates are formed using only the primary particles, and thus the filling properties are not improved, and the discharging capacity is decreased. In addition, the capacity retention is decreased.

In Comparative Example 2, a mixture of two types of particles is used, and thus the discharging capacity and capacity retention are improved as compared with Comparative Example 1. However, the filling rate is low, and thus the discharging capacity and capacity retention are decreased as compared with Examples 1 to 6.

In Comparative Example 3, core particles and fine particles having the same average particle diameters as in Example 4 are used, and the fine particles are aggregated on the peripheries of the core particles to form the cathode active material. However, the cycle characteristics are decreased as compared with Example 4. In addition, the filling rate is low, and the initial capacity is decreased as compared with Example 4. This is possibly due to the fact that the circularity in Example 4 is 0.942, while the circularity in Comparative Example 3 is 0.951.

In Comparative Example 4, the cathode active material composed of only the primary particles is used, and thus the filling properties are low as compared with Examples 1 to 6, and the discharging capacity is decreased. In addition, the capacity retention is decreased as compared with Examples 1 to 6.

In Comparative Example 5, the particle diameter ratio r1/r2 is 0.66 which exceeds 1/2, and thus the filling properties are low as compared with Examples 1 to 6, and the discharging capacity is decreased. In addition, the capacity retention is decreased as compared with Examples 1 to 6.

In Comparative Example 6, the circularity of the composite particles is 0.787 smaller than 0.800, and thus excessive gaps are produced during pressing, the filling properties are low as compared with Examples 1 to 6, and the discharging capacity is decreased. In addition, the capacity retention is decreased as compared with Examples 1 to 6.

In Comparative Example 7, the particle diameter ratio r1/r2 is 0.04 smaller than 1/20, and thus the filling properties are low as compared with Examples 1 to 6, and the discharging capacity is decreased. In addition, the capacity retention is decreased as compared with Examples 1 to 6.

In Examples 2 to 4, the circularity before pressing is improved after pressing. In addition, in Examples 2 and 4, the particle diameter D50 is larger than that in Comparative Examples 2 and 3 using the particles having the same particle diameter. Considering these points, it is supposed that the core particles in Examples 2 and 4 tend to easily remain without being cracked by pressing.

Evaluation of Particle Size Distribution

FIG. 10 shows the particle size distributions before and after pressing of only the cathode active materials of Example 2 and Comparative Example 2. In FIG. 10, curves L1, L2, and L3 show the particle size distributions below. The particle size distributions are each measured using a sample prepared by pressing only the active material with a pressing jig at 150 N/mm². As an apparatus, a particle size distribution measuring apparatus (manufactured by HORIBA Instruments, Inc., trade name: Laser Diffraction/Scattering Particle Size Distribution Analyzer) was used.

Curve L1: a curve showing the particle size distribution of the mixture of two types of particles used in Comparative Example 2 or the particle size distribution of the mixture of core particles and fine particles used in Example 2

Curve L2: a curve showing the particle size distribution of the mixture of two types of particles used in Comparative Example 2 after pressing at 150 N/mm²

Curve L3: a curve showing the particle size distribution of core particles and fine particles after pressing of composite particles of Example 2 at 150 N/mm²

FIG. 10 indicates the following.

In Comparative Example 2, the particle size distribution after pressing is changed from that before pressing. It is found from this change that the amount of large particles of 20 μm or more is decreased, and the amount of particles near 10 μm is increased.

In Example 2, it is found that the particle size distribution after pressing is substantially the same as the particle size distribution (curve L1) before coating. This is possibly due to the fact that the pressing pressure is absorbed by separation of the fine particles from the core particles coated with the fine particles, and the original particles are present without being cracked. In addition, the separated fine particles are considered to fill the gaps between the core particles and improve the filling properties.

Although the embodiments are described in detail above, the present application is not limited to the above-described embodiment and various modifications may be made on the basis of the technical idea of the present application.

For example, the configurations, methods, shapes, materials, and numerical values described above in the embodiments are only examples, and different configurations, methods, shapes, materials, and numerical values may be used according to demand, such as the configurations of the embodiments may be combined with each other.

Although, in the embodiments, an example in which the present application is applied to a battery having a cylindrical or flat shape is described, the shape of a battery is not limited to this. For example, the present application may be applied to various batteries such as a coin-shaped, button-shaped, rectangular, laminate seal-shaped batteries, and the like.

Although, in the embodiments, an example in which the present application is applied to a cathode is described, application of the present application is not limited to a cathode, and the present application may be applied to an anode.

In addition, application of the batteries according to the above embodiments is not particularly limited, and the batteries may be widely used for, for example, battery devices described below by utilizing the characteristics of light weight, high capacity, and high energy density. Namely, the batteries may be widely applied to various portable small electronic apparatuses such as a video camera, a notebook-size personal computer, a word processor, a radio-cassette recorder, a cellular phone, and the like.

Although, in the embodiments, an example in which the present application is applied to a battery having a wound structure is described, the battery structure is not limited to this. For example, the present application may be applied to a battery having a structure in which a cathode and an anode are folded, a battery having a stacked structure, and the like.

The method for forming electrodes such as a cathode and an anode is not limited. Examples of a method which may be used include a method of adding a usual binder, conductive material, and the like to a cathode material or an anode material, adding a solvent to the mixture, and then applying the resultant mixture, a method of adding a usual binder and the like to a cathode material or an anode material and applying the resultant mixture by heating, and a method of forming a cathode material or an anode material alone or a mixture of a cathode material or an anode material, a conductive material, and a binder to form a compact electrode on a current collector. In addition, an active material may be pressure-formed under heating to form an electrode having strength regardless of the presence of a binder.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An active material for a nonaqueous electrolyte secondary battery comprising:
   first particles; and
   second particles scattered on the surfaces of the first particles,
   wherein the circularity of the first particles with the second particles scattered thereon is 0.800 to 0.950; and
   the ratio r1/r2 of the average particle diameter r1 of the second particles to the average particle diameter r2 of the first particles is 1/20 to 1/2.

2. The active material for a nonaqueous electrolyte secondary battery according to claim 1,
   wherein the first particles and the second particles contain a lithium compound oxide having a mean composition represented by formula (1), (2), or (3):

$$Li_pNi_{(1-q-r)}Mn_qM1_rO_{(2-y)}X_z \quad (1)$$

wherein M1 represents at least one element selected from Groups II to XV in the periodic table excluding nickel (Ni) and manganese (Mn), X represents at least one element of Groups XVI and XVII in the periodic table excluding oxygen (O), p, q, r, y, and z are values within the ranges of $0 \leq p \leq 1.5$, $0 \leq q \leq 1.0$, $0 \leq r \leq 1.0$, $-0.10 \leq y \leq 0.20$, and $0 \leq z \leq 0.2$, respectively, a lithium composition depends on a state of charging and discharging, and a value of p indicates a value in a state of full discharging;

$$Li_aCo_{(1-b)}M2_bO_{(2-c)} \quad (2)$$

wherein M2 represents at least one element selected from the group consisting of vanadium (V), copper (Cu), zirconium (Zr), zinc (Zn), magnesium (Mg), aluminum (Al), gallium (Ga), yttrium (Y), and iron (Fe), a, b, and c are values within the ranges of $0.9 \leq a \leq 1.1$, $0 \leq b \leq 0.3$, and $-0.1 \leq c \leq 0.1$, respectively, a lithium composition depends on a state of charging and discharging, and a value of a indicates a value in a state of full discharging;

    (3)

wherein M3 represents at least one element selected from the group consisting of vanadium (V), copper (Cu), zirconium (Zr), zinc (Zn), magnesium (Mg), aluminum (Al), gallium (Ga), yttrium (Y), and iron (Fe), v, w, x, y, and z are values within the ranges of $-0.1 \leq v \leq 0.1$, $0.9 \leq w \leq 1.1$, $0<x<1$, $0<y<1$, $0<z<0.5$, $0<1-x-y-z$, respectively, a lithium composition depends on a state of charging and discharging, and a value of w indicates a value in a state of full discharging.

3. The active material for a nonaqueous electrolyte secondary battery according to claim 2,
wherein at least one element different from a main transition metal element contained in the first particles and the second particles is present on at least a portion of the surface of each of the first particles and the second particles.

4. The active material for a nonaqueous electrolyte secondary battery according to claim 3,
wherein the element different from the main transition metal contained in the first particles is at least one of nickel (Ni), manganese (Mn), magnesium (Mg), fluorine (F), and phosphorous (P).

5. The active material for a nonaqueous electrolyte secondary battery according to claim 1,
wherein a specific surface area of the first particles with the second particles scattered thereon is 0.1 $m^2/g$ to 0.5 $m^2/g$.

6. The active material for a nonaqueous electrolyte secondary battery according to claim 1, wherein a molar ratio of first particles to second particles ranges from 1:1 to 1:30.

7. The active material for a nonaqueous electrolyte secondary battery according to claim 1, wherein the active material has a void ratio of 20% or less.

8. An electrode for a nonaqueous electrolyte secondary battery comprising:
a current collector; and
an active material layer formed on at least one surface of the current collector,
wherein the active material layer includes an active material comprising:
first particles; and
second particles scattered on the surfaces of the first particles,
wherein the circularity of the first particles with the second particles scattered thereon is 0.800 to 0.950; and
the ratio r1/r2 of the average particle diameter r1 of the second particles to the average particle diameter r2 of the first particles is 1/20 to 1/2.

9. The electrode for a nonaqueous electrolyte secondary battery according to claim 8, wherein the electrode is a cathode.

10. The electrode for a nonaqueous electrolyte secondary battery according to claim 8, wherein a specific surface area of the first particles with the second particles scattered thereon is 0.1 $m^2/g$ to 0.5 $m^2/g$.

11. The electrode for a nonaqueous electrolyte secondary battery according to claim 8, wherein a molar ratio of first particles to second particles ranges from 1:1 to 1:30.

12. A nonaqueous electrolyte secondary battery comprising:
a cathode;
an anode; and
a separator provided therebetween,
wherein at least one of the cathode and the anode includes a current collector and an active material layer formed on at least one surface of the current collector,
wherein the active material layer includes an active material comprising:
first particles; and
second particles scattered on the surfaces of the first particles,
wherein the circularity of the first particles with the second particles scattered thereon is 0.800 to 0.950; and
the ratio r1/r2 of the average particle diameter r1 of the second particles to the average particle diameter r2 of the first particles is 1/20 to 1/2.

13. The electrode for a nonaqueous electrolyte secondary battery according to claim 12, wherein a specific surface area of the first particles with the second particles scattered thereon is 0.1 $m^2/g$ to 0.5 $m^2/g$.

14. The electrode for a nonaqueous electrolyte secondary battery according to claim 12, wherein a molar ratio of first particles to second particles ranges from 1:1 to 1:30.

* * * * *